United States Patent [19]

Dietrich

[11] Patent Number: 5,201,399
[45] Date of Patent: Apr. 13, 1993

[54] REORIENTATION METHOD AND APPARATUS FOR MOVING OBJECTS

[75] Inventor: Gunter Dietrich, Hille, Fed. Rep. of Germany

[73] Assignee: Kolbus GmbH & Co. KG, Rahden, Fed. Rep. of Germany

[21] Appl. No.: 931,046

[22] Filed: Aug. 17, 1992

[30] Foreign Application Priority Data

Aug. 19, 1991 [DE] Fed. Rep. of Germany ....... 4127207

[51] Int. Cl.$^5$ ............................................. B65G 47/24
[52] U.S. Cl. .................................................. 198/409
[58] Field of Search ..................... 198/408, 409, 463.3

[56] References Cited

U.S. PATENT DOCUMENTS

| 3,650,409 | 3/1972 | Klostermann | 198/409 |
| 3,771,671 | 11/1973 | Cathers . | |
| 4,681,500 | 7/1987 | Rathert et al. . | |
| 4,699,564 | 10/1987 | Cetrangolo . | |
| 4,977,993 | 12/1990 | Chapman | 198/409 X |

FOREIGN PATENT DOCUMENTS

| 307282 | 8/1918 | Fed. Rep. of Germany . |
| 323654 | 7/1920 | Fed. Rep. of Germany . |
| 1741576 | 8/1953 | Fed. Rep. of Germany . |
| 1766984 | 3/1958 | Fed. Rep. of Germany . |
| 1047713 | 12/1958 | Fed. Rep. of Germany . |
| 1873135 | 6/1963 | Fed. Rep. of Germany . |
| 35711 | 1/1965 | Fed. Rep. of Germany . |
| 1208289 | 7/1966 | Fed. Rep. of Germany . |
| 2027906 | 1/1971 | Fed. Rep. of Germany . |
| 7335166 | 9/1973 | Fed. Rep. of Germany . |
| 2226455 | 12/1973 | Fed. Rep. of Germany . |
| 2943260 | 5/1981 | Fed. Rep. of Germany . |
| 3214457 | 10/1983 | Fed. Rep. of Germany . |
| 3443071 | 6/1985 | Fed. Rep. of Germany . |
| 3413222 | 10/1985 | Fed. Rep. of Germany . |
| 234392 | 4/1986 | Fed. Rep. of Germany . |
| 3445928 | 6/1986 | Fed. Rep. of Germany . |
| 8709053 | 10/1987 | Fed. Rep. of Germany . |
| 3840816 | 6/1990 | Fed. Rep. of Germany . |
| 4022160 | 1/1992 | Fed. Rep. of Germany . |
| 632216 | 9/1982 | Switzerland . |

Primary Examiner—D. Glenn Dayoan
Attorney, Agent, or Firm—Chilton, Alix & Van Kirk

[57] ABSTRACT

Apparatus for reorienting books or like objects, for example from a vertical to a horizontal orientation, while the products are continuing to move along a conveying system. The apparatus comprises a transfer device which defines a clamping space into which the moving object is delivered, the transfer device being rotatable between the first and second orientations while object movement continues, the clamping action being releasable when the second orientation is reached so that the object can be fed onto a downstream conveyor.

16 Claims, 2 Drawing Sheets

REORIENTATION METHOD AND APPARATUS FOR MOVING OBJECTS

BACKGROUND OF THE INVENTION

1. Field of the Invention

The present invention relates to the reorientation of objects moving on a conveying system and particularly to the transfer of books from a position where they are supported on their spines, i.e., in an upright or vertical orientation, to a position where they are supported on a side surface, such transfer being accomplished without interruption in forward movement. More specifically, this invention is directed to apparatus for altering the orientation of books or like products during movement thereof through a system and especially to apparatus for imparting 90° of rotational motion to objects arriving serially on a conveying system, such rotation being imparted without interrupting the object motion. Accordingly, the general objects of the present invention are to provide novel and improved methods and apparatus of such character.

2. Description of the Prior Art

While not limited thereto in its utility, the present invention is particularly well-suited for use in the manufacture of books. During the manufacture of a book, partially completed or finished books will often be caused to move in serial fashion along a conveyor system while being supported on their spines. It will typically be necessary, in order to perform further manufacturing operations or for boxing, for the books to be transferred from the upright position, where they are supported on their spines, to a horizontal or flat position where they are lying on one of their sides. This reorientation must be done with a relatively high degree of speed, and without interrupting the motion of the conveying system, in order to insure sufficiently high production rates. The reorientation also imposes the contradictory requirement of gentle treatment of the books on the transfer apparatus. This 90° reorientation of books moving on a conveying system has presented particularly difficult problems in the handling of heavy books of large format.

Published German Patent Application 29 43 260 discloses a prior art apparatus for transferring books from a vertical, upright position to a horizontal, lying position. The apparatus of the published application employs a pair of roller tracks which are located at right angles to one another. These roller tracks are provided with power-driven rollers, and each track is twisted about its longitudinal centerline in a helix-like configuration. Support rods are located so as to be parallel to the vertically upright rollers of the second track and are spaced from the second track. The support rods, in the region extending from the feed end of the roller track into the transition zone where the rollers depart from the vertical position and progress to the horizontal position, prevent the incoming books from opening during the reorientation process.

Apparatus of the type disclosed in German Application 29 43 260 cannot, particularly in the case of large format, heavy books, insure that the books being handled will be treated with the necessary gentleness. This lack of the requisite gentle treatment inherently results from the fact that, while the books are being transferred from the upright to the horizontal position, they are supported solely by one joint edge while traveling through a relatively long distance on the roller track. This edge support leads to deformation of the book.

A further disadvantage of the prior art, inherent in the apparatus of German Application 29 43 260, is that the transfer apparatus is volumetrically inefficient in that it requires considerable length and thus takes up a significant amount of floor space.

SUMMARY OF THE INVENTION

The present invention overcomes the above-discussed and other deficiencies and disadvantages of the prior art by providing a novel technique for accomplishing the reorientation of objects moving along a conveyor system. The present invention also encompasses apparatus for implementing the aforesaid novel technique, such apparatus guaranteeing the gentle handling of the objects being reoriented and implementing the transfer operation within an extremely small space.

Apparatus in accordance with the invention is particularly well suited for transferring books or similar products from an upright position to a horizontal position, or vice versa, while the objects to be transferred are passing through a system. The apparatus, in accordance with a preferred embodiment, comprises a power-driven, belt-action transfer device which receives and clamps the incoming books. The transfer device is capable of rotation through the desired reorientation angle and thus may be moved between a receiving position, where it is in registration with a feed conveyor, and a discharge position, where it is in registration with a discharge conveyor. Assuming that the conveying device reorients objects from a vertical to a horizontal position, one of the elements of the transfer device which performs the book clamping function will be displaced relative to a cooperating element when the conveying device moves into registration with the discharge conveyor whereby the object being reoriented will be released and driven onto the discharge conveyor.

BRIEF DESCRIPTION OF THE DRAWINGS

The present invention may be better understood and its numerous objects and advantages will become apparent to those skilled in the art by reference to the accompanying drawings wherein like reference numerals refer to like elements in the figures and in which.

DESCRIPTION OF THE DISCLOSED EMBODIMENT

Figure 1:
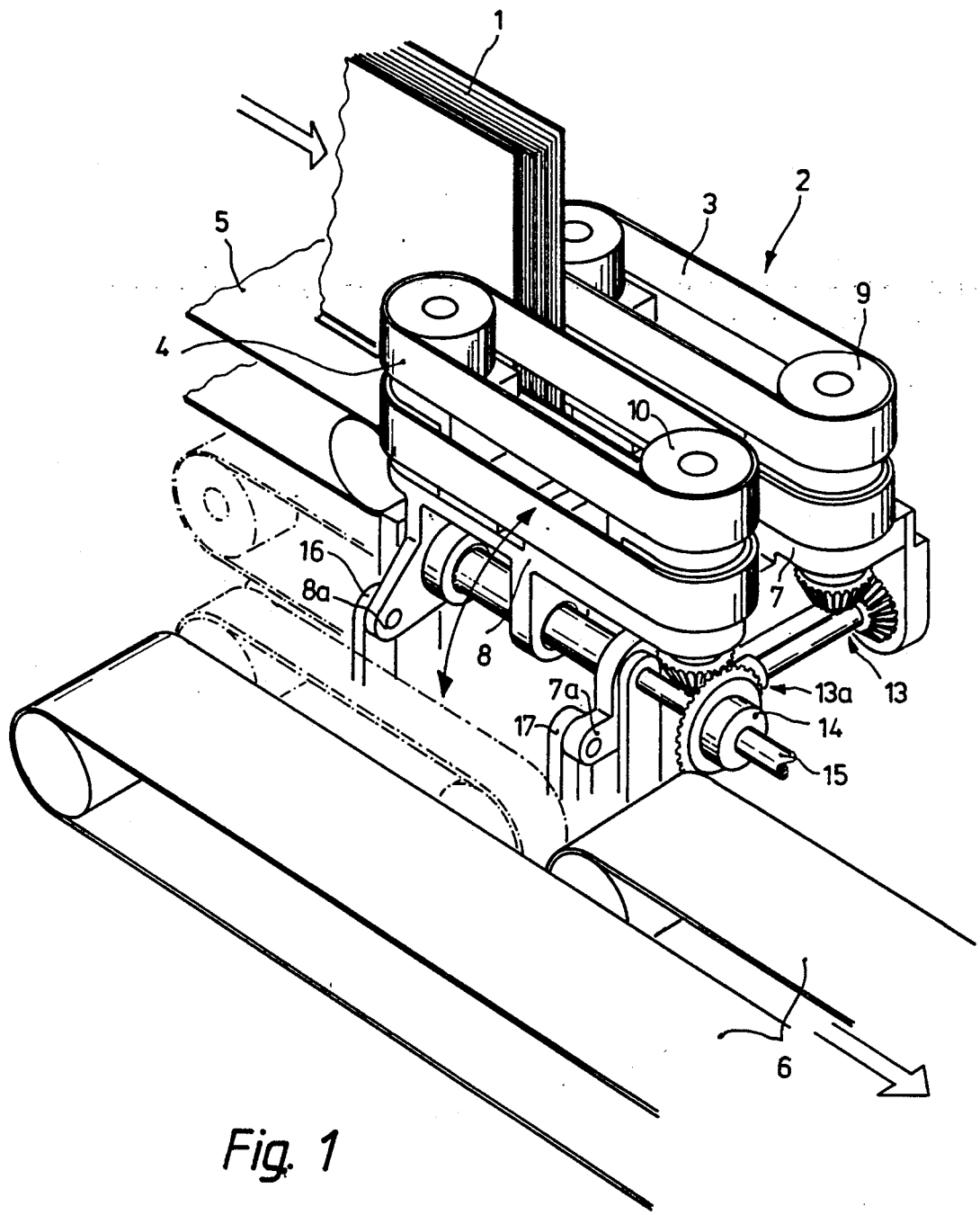
FIG. 1 is a perspective view of apparatus in accordance with a preferred embodiment of the invention.

Referring to the drawings, apparatus in accordance with the invention has been disclosed in the environment of a book production line. The apparatus thus receives books, indicated at 1, which are emerging from an upstream machine in a vertical orientation wherein the books are standing on their spines. The function of the disclosed apparatus is to transfer the books 1 from the upright position shown in FIG. 1 through an angle of 90° so that the books will be supported on a large, flat side surface. This transfer from the vertical to horizontal orientation is accomplished through the use of a belt-action transfer device which has been indicated generally at 2. The device 2 comprises a pair of spatially displaced, continuously driven, endless belt runs 3 and 4. In the disclosed embodiment, the belt runs 3 and 4 each comprise a pair of parallel, spatially displaced belts. In the arrangement depicted in FIG. 1, the serially received, incoming books 1 are delivered, by a belt conveyor 5, into the space between the belt runs 3 and 4. The spacing between the belt runs 3 and 4 is selected or adjusted such that the incoming books will be clamped between, and thus supported by, the belts 3, 4. In the manner to be described below, as a clamped book 1 continues to move in the forward direction in the transfer device 2, the belt runs 3, 4 are caused to execute a superimposed swinging movement from the vertical orientation, depicted in solid lines in FIG. 1, to a horizontal orientation which is depicted in phantom in FIG. 1. When this swinging movement is completed, the book, which is now horizontally oriented, will be driven onto a discharge conveyer 6 which, in the disclosed embodiment, comprises a pair of parallel belts which have their upper surfaces located in the same horizontal plane.

The belt runs of the conveying device 2 are preferably defined by nap-surfaced belts which pass about respective reversing rollers 9 and 10. The reversing rollers 9 and 10 are respectively mounted from pivotal frames 7 and 8. One of the reversing rollers associated with each belt run is continuously driven via bevel gearing, indicated at 13 and 13a, from a common bevel drive gear 14.

The pivotal frames 7 and 8 are supported for rotation about a common pivot shaft 15. The swinging movement of the belt runs 3, 4 originates from cams, not shown, and is transmitted to the frames 7, 8 via actuating rods 16 and 17. The actuating rods 16 and 17 are respectively connected to, and act on, projecting portions 8a and 7a respectively of frames 7 and 8. In the preferred embodiment, the cams which impart motion to the actuating rods 16 and 17 are arranged such that the return movement of the two belt runs 3 and 4 is not simultaneous, i.e., in the disclosed embodiment the belt run 3 will be caused to swing back to its starting position before return motion is imparted to belt run 4. Accordingly, the clamp defined by the belt runs is opened when the transfer device comes into registration with discharge conveyor 6 and the belt run 4 will deliver the book or other object onto the discharge conveyor. Such desynchronization, while not essential to operation, will increase the speed of operation of the apparatus and thus will maximize the throughput of books.

Figure 2:
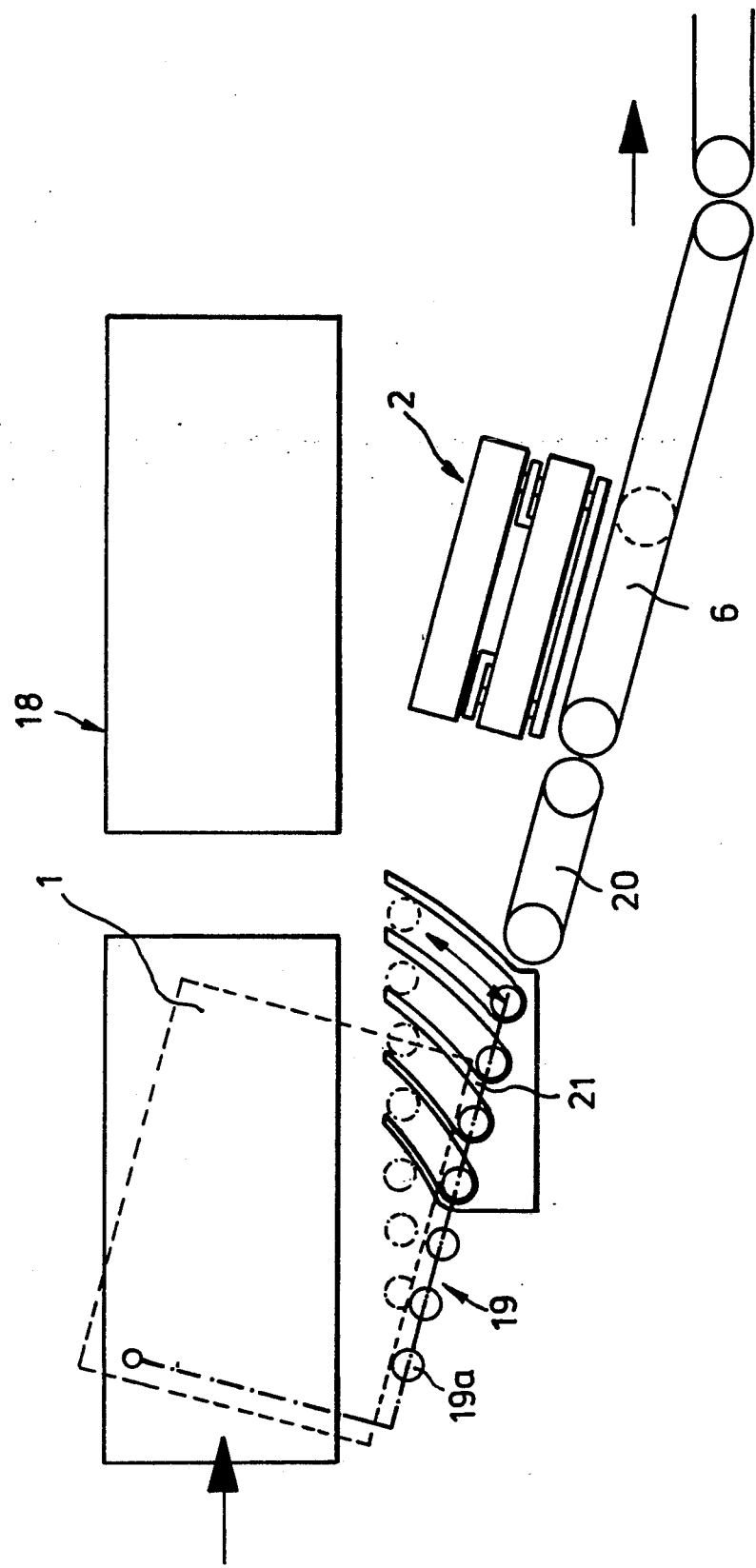
FIG. 2 is a schematic showing of the apparatus of FIG. 1 associated with a bookbinding machine having a tiltable roller conveyor.

Referring to FIG. 2, a conveying device 2 of the type depicted in FIG. 1 is shown installed below a gripper-type transport system 18 associated with a bookbinding machine. In the FIG. 2 operating environment, a conveyor 19, which may be tilted from a horizontal plane into a downwardly sloping plane, receives the incoming books 1. Conveyor 19 is provided with power-driven rollers 19a which have a non-slip surface covering. The transfer apparatus 2 is installed at an inclination which corresponds to that of the downwardly tilted conveyor 19. The books 1 released by the gripper-transport system 18 of the bookbinding machine are fed to the transfer apparatus 2 via a short intermediate conveyor belt 20. Supporting elements 21 are provided at the sides of conveyor 19 in order to support the moving upright books 1 laterally, the rollers 19a of conveyor 19 moving between these supporting elements.

The conveying apparatus 2, operating in combination with the tiltable roller conveyor 19, enables books 1 or similar products to be guided from a gripper-transport system 18 in a downward direction, and to be reoriented, within an extremely small space.

While a preferred embodiment of the invention, and a preferred operating environment, have been shown and described, it is to be understood that the illustrative embodiment shown in the drawings is amenable to numerous modifications. For example, instead of the use of nap-surface belts for the belt runs 3 and 4, other transport means such as roller conveyors or plate-chain conveyors with a non-slip surface covering may be utilized. It should also be obvious to those skilled in the art that apparatus in accordance with the invention may be employed for transferring books or like products from a generally horizontal position to a generally vertical position. Accordingly, the invention has been described by way of illustration and not limitation.

What is claimed is:

1. Apparatus for transferring moving products between a first orientation and a second orientation comprising:

transfer means, said transfer means comprising a pair of spatially displaced conveyor means, said conveyor means defining an open ended clamping region therebetween;

means for imparting motion to said conveyor means whereby a moving object fed into the said clamping region will continue to move in a forward direction;

pivotal frame means for supporting said conveyor means, said frame means having a first position wherein said conveyor means are oriented such that said clamping region is in registration with a product feed device, said frame means having a second position angularly offset from said first position wherein said clamping region is in registration with product receiving means; and means for imparting rotational motion to said frame means whereby an object fed into said clamping region will be transferred from said first orientation to said second orientation and released to the receiving means, the rotational motion being superimposed on the forward movement of the object.

2. The apparatus of claim 1 wherein said conveyor means are supported on respective frame means and wherein said means for imparting motion to said frame means causes said frame means to rotate in synchronism in a first direction and in an out-of-phase relationship in a second opposite direction whereby an object clamped between said conveyor means will be unclamped when transferred to the second orientation.

3. The apparatus of claim 1 wherein said conveyor means each comprise at least a first conveyor belt, the conveyor belts of said first and second conveyor means being generally parallelly oriented in said clamping region.

4. The apparatus of claim 2 wherein said conveyor means each comprise at least a first conveyor belt, the conveyor belts of said first and second conveyor means being generally parallelly oriented in said clamping region.

5. The apparatus of claim 3 wherein said conveyor means belts are nap-surfaced.

6. The apparatus of claim 4 wherein said conveyor means belts are nap-surfaced.

7. The apparatus of claim 3 wherein said conveyor means each comprise a pair of spacially displaced continuous belts, the belts of each pair being arranged generally parallel to one another.

8. The apparatus of claim 4 wherein said conveyor means each comprise a pair of spacially displaced continuous belts, the belts of each pair being arranged generally parallel to one another.

9. An object feed system comprising:
transport means, said transport means moving objects in a first direction in spaced-apart relationship and in a first orientation;
a tiltable conveying means, said tiltable conveying means intercepting said transport means and receiving the objects being transmitted therealong in said first direction, the objects received on said tiltable conveying means continuing to move in a forward direction which is angularly related to said first direction while being supported in said said first orientation;
transfer means in registration with the path of movement of objects on said tiltable conveying means, said transfer means receiving objects serially moving along said tiltable conveying means and rotating said objects into a second orientation, said transfer means comprising:
a pair of spatially displaced conveyor means, said conveyor means defining an open ended clamping region therebetween;
means for imparting motion to said conveyor means whereby a moving object fed into the said clamping region will continue to move in a forward direction;
pivotal frame means for supporting said conveyor means, said frame means having a first position wherein said conveyor means are oriented such that said clamping region is in registration with the path of movement of objects supplied by said tiltable conveying means, said frame means having a second position angularly offset from said first position; and
means for imparting rotational motion to said frame means whereby an object fed into said clamping region will be transferred from said first orientation to said second orientation, the rotational motion being superimposed on the forward movement of the object; and
receiving means in registration with the said second position of said frame means whereby an object rotated into the second orientation will be delivered by said conveyor means onto said receiving means.

10. The apparatus of claim 9 wherein said tiltable conveying means comprises power-driven rollers with a non-slip surface.

11. The apparatus of claim 9 wherein said transfer means is installed at an angle of inclination which corresponds to the plane defined by said downwardly-tilted conveying means.

12. The apparatus of claim 10 wherein said transfer means is installed at an angle of inclination which corresponds to the plane defined by said tiltable conveying means.

13. The apparatus of claim 9 wherein said conveyor means are supported on respective frame means and wherein said means for imparting motion to said frame means causes said frame means to rotate in synchronism in a first direction and in an out-of-phase relationship in a second opposite direction whereby an object clamped between said conveyor means will be unclamped when transferred to the second orientation.

14. The apparatus of claim 13 wherein said conveyor means each comprise at least a first conveyor belt, the conveyor belts of said first and second conveyor means being generally parallelly oriented in said clamping region.

15. The apparatus of claim 14 wherein said conveyor means each comprise a pair of spacially displaced continuous belts, the belts of each pair being arranged generally parallel to one another.

16. The apparatus of claim 15 wherein said conveyor means belts are nap-surfaced.

* * * * *